3 Sheets—Sheet 1.

S. D. LOCKE.

Grain-Binder.

No. 8,991. Reissued Dec. 9, 1879.

Attest:
H. L. Perrine
Daniel Kelly.

Inventor:
Sylvanus D. Locke
By. Pennington & Pennington
Atty's

3 Sheets—Sheet 2

S. D. LOCKE.

Grain-Binder.

No. 8,991. Reissued Dec. 9, 1879.

Attest:
H. L. Pennie.
Saml. Hilly.

Inventor:
Sylvanus D. Locke
By. Dennison & Dennison
Atty's.

S. D. LOCKE.

Grain-Binder.

No. 8,991. Reissued Dec. 9, 1879.

Attest:
H. L. Perrine
Saul Kelly.

Inventor:
Sylvanus D. Locke
By Parkinson & Parkinson
Atty's

UNITED STATES PATENT OFFICE.

SYLVANUS D. LOCKE, OF HOOSICK FALLS, NEW YORK.

IMPROVEMENT IN GRAIN-BINDERS.

Specification forming part of Letters Patent No. 97,531, dated December 7, 1869; Reissue No. 8,991, dated December 9, 1879; application filed September 6, 1879.

*To all whom it may concern:*

Be it known that I, SYLVANUS D. LOCKE, formerly of Janesville, Rock county, State of Wisconsin, but now of Hoosick Falls, in the county of Rensselaer and State of New York, have invented certain new and useful Improvements in Machines for Binding Grain, of which the following is a specification.

My invention consists in a rotary twister formed with radial peripheral teeth, into which the wire is thrown directly for twisting, and by the engagement of which the twister is driven; in supporting such twister upon the ends of the teeth by which it twists and is driven; in wire-holding and wire-cutting mechanism for grain-binders, and in the various combinations hereinafter described and claimed.

Figure 1:
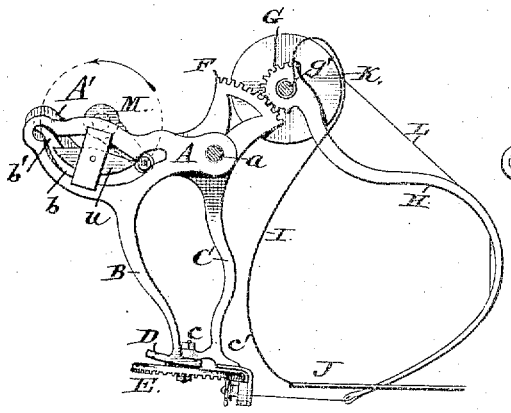
Figure 2:
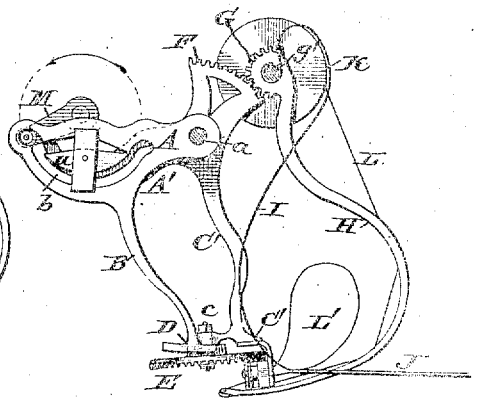
Figure 3:
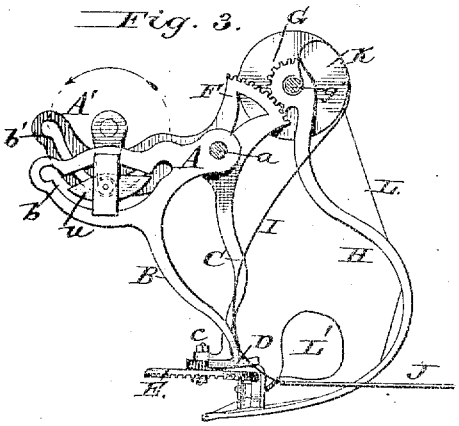
Figure 4:
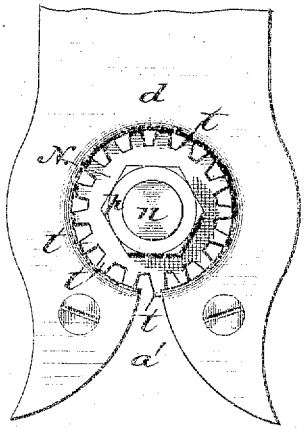
Figure 5:
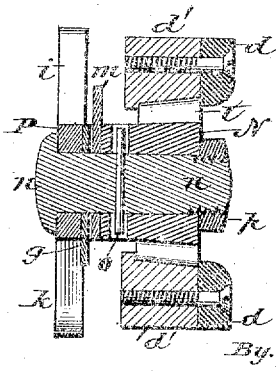
Figure 6:
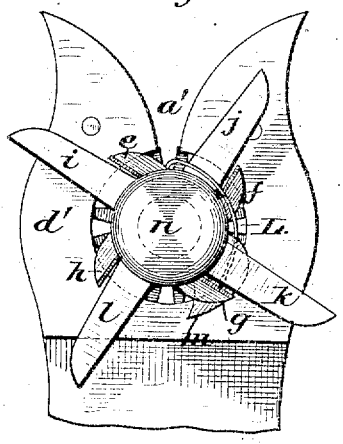
Figure 7:
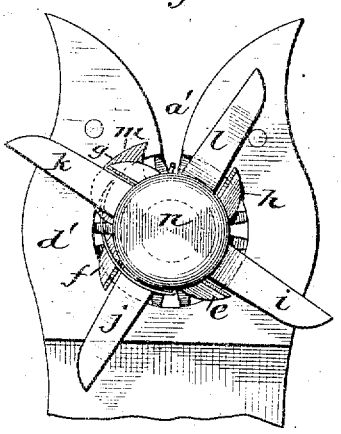
Figure 8:
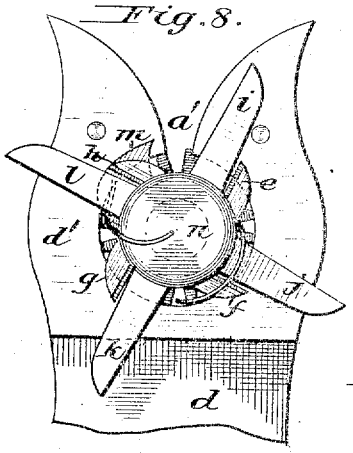
Figure 9:
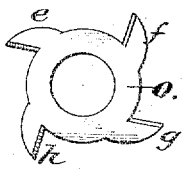
Figure 10:
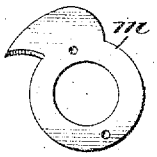
Figure 11:
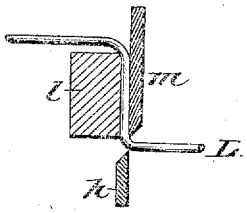
Figure 12:
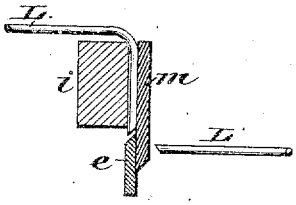
Figure 15:
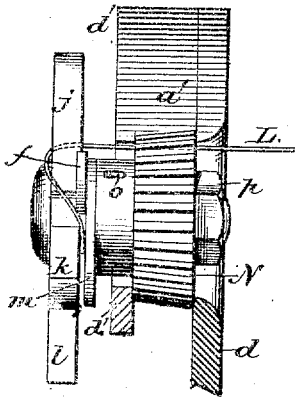
Figure 13:
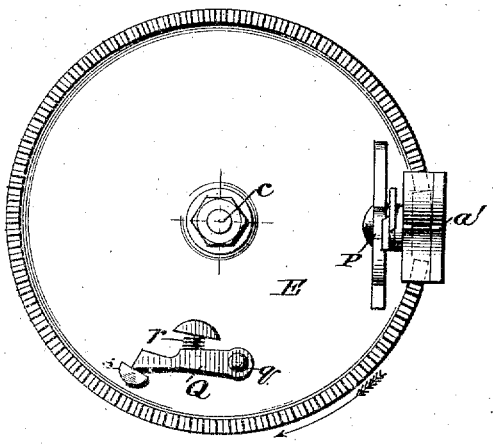
Figure 14:
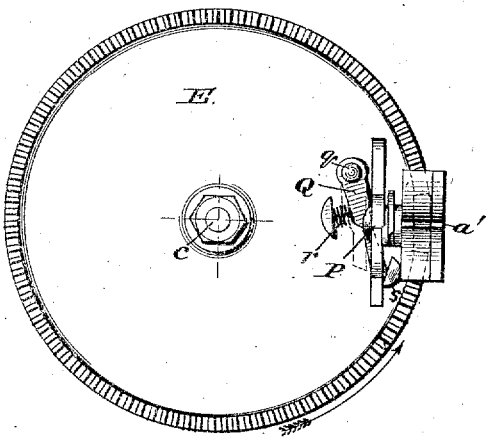
Figure 16:
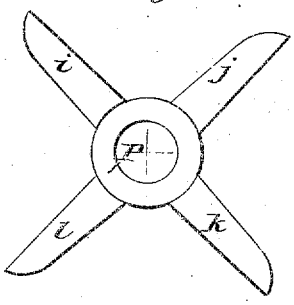
Figure 17:
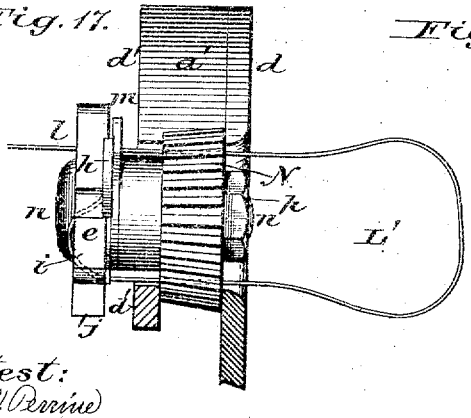
Figure 18:
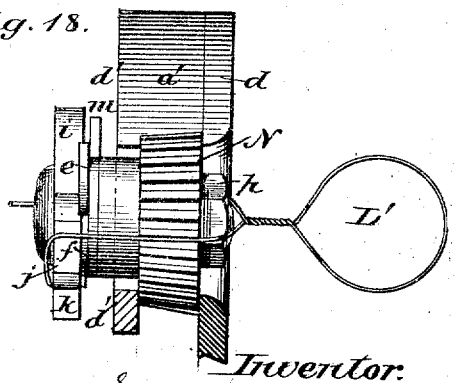

In the drawings, Figures 1, 2, and 3 are side views, showing one mode of constructing the mechanism for operating my improvements, together with certain of the positions which said mechanism and the binding-wire assume during the operation of binding. Fig. 4 is a front view of the twister and its casing. Fig. 5 is a section of the same, taken upon a horizontal line through Fig. 4, and including the wire-cutting and wire-holding devices. Figs. 6, 7, and 8 are rear views of the twister and its casing, with the wire-cutting and wire-holding devices intervened, and showing the different positions of these several parts and of the binding-wire during the operation of binding. Fig. 9 is an elevation, in detail, of the rotary part of the cutting mechanism. Fig. 10 is an elevation, in detail, of the converse part of the cutting mechanism attached to and carried by the twister. Figs. 11 and 12 are sections of the cutting and holding mechanism, showing how the binding-wire is cut and the end held. Figs. 13 and 14 are under-side views of the binding-head and gear-wheel shown in Figs. 1, 2, and 3, illustrating the manner in which the twisting, cutting, and holding devices are operated. Fig. 16 is an elevation, in detail, of the rotary part of the wire-holder. Figs. 15, 17, and 18 are side views with the inclosing-shell support in section, showing the different positions of the several parts and of the binding-wire during the operation of binding.

A and A′ are cam-arms, pivoted at *a*, and operating, respectively, the twisting-arm B and the arm C, which carries the binding-head. On the twisting-arm is a curved rack, D, playing in a pinion attached to the gear-wheel E, that turns on the stud *c* on the arm C. To the latter arm is attached the segmental gear F, which meshes with the segmental pinion G, pivoted at *g′*, and having attached the third or band-carrying arm, H.

I is the grain-guard; J, the binding-platform or grain-receptacle; K, the reel for bearing the binding material, and L the binding-wire.

All the mechanism is actuated, primarily, by the crank M, that plays in the cam-grooves *b b′* in the cam-arms A and A′. The form of these cam-grooves is such as to give to the arms B, C, and H the movements hereinafter described, as will be more fully understood by reference to Letters Patent No. 97,531, granted me December 7, 1869, of even date with the patent of which this is a reissue.

N is the twister, formed like a pinion, the interdental spaces being of sufficient depth to admit the wire between their bottoms and the crests of the intermeshing gear-teeth, so that each tooth may serve at once as a twisting-arm and a leaf or cog for driving the twister, and each interdental space as a slot for receiving the wire. The twister is here shown as slightly beveled, but may be a spur-pinion in shape. It takes bearing only upon the ends of its teeth in the parts *d d′* of the inclosing-shell, which parts are attached together by screws, as shown, or otherwise, and secured in any suitable manner to the hand *e′* of the arm C. This shell is slitted at *a′* to admit the wire to the twisting-pinion, and so formed as to leave both ends of the pinion and the inner portions of the teeth and indentations fully exposed to give a space through which the wire may gyrate while being twisted. The pinion is operated by the gear-wheel E, which has access to it through a slot or opening in one side of the casing, as represented in the first three figures, and, among others, in Fig. 13, the teeth of the gear-wheel meshing directly with the twisting-teeth of the pinion through said slot.

Firmly attached to the outer end of the twisting-pinion, by rivets or otherwise, is a plate, *m*, that is, as to its edge, a knife, against which the radial blades *e f g h* of the rotary cutter O (shown in detail in Fig. 9) alternately work after the manner of shears to cut or sever the wire, and which, as to its side face, is a jaw, against which the radial arms *i j k l* of the rotary holder P alternately press the wire, so as to thereby hold the cut or free end. The circular body of the rotary holder is recessed, as shown more particularly in Fig. 16, to receive the circular body of the rotary cutter, into which recess the latter is so far inserted as to leave between the radial arms of the holder and the face of the plate *m* a breadth of space slightly less than the diameter of the binding-wire to be held.

The rotary cutter moves with the rotary holder, and it may be held in the right position relative thereto, as shown in the drawings, in any desired manner, as by pins, or by so shaping the recess as to securely prevent the two from turning upon each other. They are mounted and turn freely upon a bolt, *n*, that passes centrally through the pinion, and that, by means of its nut *p*, holds them firmly clamped together and pressed against their converse part upon the pinion, with which latter they revolve during the twisting operation. The bolt is held from turning in the pinion, and thus loosening the nut, by means of a pin, *o*, passing through the two. This bolt gives bearing to the rotary holder and cutter, and allows them to be readily adjusted, by means of its nut and the use of washers between the parts, at any desired distance from the plate *m*, carried by the twister, so as to permit the use of any desired size of wire.

On the face of the gear-wheel, and in the path traced by the rotary holder, is a dog or latch, Q, Figs. 13 and 14, swinging upon the vertical pivot *q*, and held by the spring *r* against the lug or projecting portion *s* of the wheel. This dog serves as a stop to the cutter and holder in their revolution with the twisting-pinion, so that in the latter part of the twisting operation the pinion may be driven past them to sever the wire, as hereinafter more fully described.

To operate the machine, the various parts being in the position shown by Fig. 1, the end of the binding-wire L is carried from the reel K on or along the arm H, passed through an eye or guide in the point of the latter, and then, being taken into and through the mouth *a'* of the shell *d d'*, and between the teeth *t* of the pinion N, and placed around one of the radial arms, *j*, of the rotary part of the wire-holder, it is inserted between another radial arm, *k*, and the converse part or plate *m*, as fully shown in Figs. 1, 6, and 15.

The crank turning, as indicated by the arrow, the arms B and C open or separate to allow the gavel to be brought in on the platform J against the guard I, when, the arms closing, the binding-wire is looped, as at L', around it, and again inserted in the teeth of the twisting-pinion, as shown in Figs. 2, 7, and 17.

The form of the cam-grooves *b b'* must be as shown in the drawings, so as to cause the two ends of the wire passing around the gavel to be inserted in the teeth on opposite sides of the twisting-pinion, one end being laid in the teeth as the band-carrying arm is withdrawn to receive the fresh gavel, and the other upon its return to encircle this gavel, a half-revolution being given the pinion in the interval by the divergence of the cam-grooves.

The wire having been passed around the gavel, and both ends being inserted in the teeth of the twisting-pinion, the crank, continuing to rotate, is now compelled by the gravitating block *u* to pass into the upper groove of the cam in the arm A, driving down this arm, and, through the arm B and rack, operating the gear-wheel E, that, in turn, causes the pinion and the attached wire-holding and wire-cutting mechanism to rapidly revolve, so twisting together the ends of the wire, as represented in Fig. 18.

The position of the wire-holding and wire-cutting mechanism with their operating-dog is shown in Fig. 13. During the latter part of the twisting operation the movement of the gear-wheel E in the direction indicated by the arrow in said figure carries the free end of the dog underneath the revolving radial arms in such manner as to stop and move backward one of these arms, *j*, to the position before occupied by the arm *i*.

The movement of the radial arms is backward only relatively to the revolution of the twisting-pinion, as the real effect of the dog is simply to stop the movement of the rotary parts of the wire-holding and wire-cutting devices until the movement of the pinion shall carry forward over one of the spaces between the radial arms the converse part *m*, the arm striking the face of the dog or latch and riding over it until it drops off at the end, and is again free to revolve.

The relative position of the wire-holding and wire-cutting mechanism and of the binding-wire before the differential movement just described is shown in Figs. 7 and 17, and their relative position after this movement in Figs. 8 and 18.

The backward movement or stopping of the wire-holding and wire-cutting mechanism in causing the radial arm *l* and radial blade *h* to take the position relative to the plate *m*, carried by the twisting-pinion, respectively shown by the arm *k* and blade *g* in Fig. 7, first forcibly doubles the reel end of the band between the arm *l* and the face of the plate, and then severs it from the gavel portion by the action of the blade *h* against the edge of the plate. In this same movement, by which the new end of the wire is seized and cut, the arm *k* being carried onward and away from its former position over the plate, the old end of the wire is released.

After the wire is twisted, seized, and cut off, as above described, the crank runs out of the upper cam-groove in the cam-arm A and comes to its starting-point, causing the arms to open and all of the parts to assume the position shown in Figs. 1, 6, and 15, when the bundle can be removed. In reaching this position the gear-wheel E is reversed, as indicated by the arrow in Fig. 14, and runs back, carrying with it the dog, which the revolving radial arms in their passage swing inwardly upon its pivot, as shown in dotted lines, without themselves being operated. When these arms have passed, the dog is driven back by its spring, and rests against its stop in readiness to meet the arms as they return in the next binding operation and again actuate them relatively to the twisting-pinion and its plate.

I claim as my invention—

1. A rotary twister having radial twisting-arms adapted to mesh into a series of gear-teeth to drive the twister.

2. A rotary twister formed with teeth around the periphery, by which it is driven and by which the wire is twisted, each of the spaces between said teeth being adapted to receive the wire.

3. A rotary twister formed with teeth around the periphery, by which it is driven and by which the wire is twisted, in combination with a shell or casing which exposes the inner portions of the teeth and interdental spaces.

4. A rotary twister formed with teeth around the periphery, by which it is driven and by which the wire is twisted, in combination with a shell or casing in which the twister takes bearing by the ends of said teeth.

5. A rotary twister having radial twisting-arms, in combination with a shell or casing in which it is supported, and a series of gear-teeth meshing with said twisting-arms through a slot in the side of the casing, to drive the twister.

6. A rotary twister formed with teeth around the periphery, by which it is driven, in combination with a shell or casing in which it takes bearing by the end of its teeth, while the inner portions of the teeth and interdental spaces are exposed, and a gear-wheel meshing directly with said teeth through an opening in the side of the casing to drive the twister.

7. The combination of a rotary twister driven by the engagement of its radial twisting-arms and a rotary holder formed with radial holding-arms, by the engagement of which the differential movement of the twister and holder is determined.

8. The combination of a rotary twister driven by the engagement of its radial twisting-arms and a rotary holder mounted upon the same axis therewith and formed with radial holding-arms, by the engagement of which the differential movement between the twister and holder is determined.

9. The combination of a rotary twister driven by engagement of its radial twisting-arms with a cutter for severing the gavel portion of the wire from the reel portion at the conclusion of the twisting operation.

10. The combination of a rotary twister having a cutting-edge, and driven by engagement of its radial twisting-arms, a rotary cutter having radial cutting-arms contiguous to and mounted upon the same axis with the twister, and rotating therewith during the twisting operation, and mechanism for causing differential movement between said cutter and twister at the conclusion of the twisting operation, to cut the wire.

11. The combination of a rotary twister driven by the engagement of its radial twisting-arms with a cutter for severing the gavel portion of the wire from the reel portion and a holder for retaining the end of the reel portion in readiness for the next binding operation.

12. The combination of a rotary twister with a rotary holder and cutter revolving therewith during the twisting operation, and having radial arms and cutting-edges, by the engagement of which the differential movement relatively to the twister is determined, to cut and hold the wire.

13. The combination of a rotary twister driven by the engagement of its radial twisting-arms and a rotary holder and cutter rotating together and formed with radial holding-arms and cutting-edges corresponding with each of said arms, the differential movement between the twister and cutter being caused by the engagement of said radial holding-arms.

14. A rotary twister having a cutting-edge and driven by engagement of its radial twisting-arms, in combination with a rotary holder and cutter mounted upon the same axis and lying in contact therewith, rotating together, having radial holding-arms and cutting-edges, and controlled, as to the differential movement relatively to the twister, by the engagement of the radial holding-arms.

15. A rotary holder and cutter fixed together and formed with radial holding-arms and cutting-edges corresponding with each of said arms, the holding-surfaces being in advance of and slightly above the plane of the cutting-edges.

16. The combination, with the rotary twister and its holding and cutting plate, of the contiguous rotary holder and cutter turning upon the same axis, and having holding-surfaces in advance of and slightly above the plane of the cutting-edges.

17. A rotary holder adjustable as to its distance from the converse clamping-surface, to admit of the use of different sizes of wire.

18. In combination with a rotary twister and a clamping-plate carried thereby, a rotary holder mounted upon the same axis and adjustable as to its distance from the surface of the clamping-plate.

19. The combination, with the rotary twister and the rotary holder and cutter, of the gear-wheel and its dog or latch.

20. A rotary twister taking bearing in a casing upon the ends of its radial twisting and driving teeth, in combination with a superposed rotary cutter and a central bolt passing axially through the twister and cutter and holding them together.

21. A rotary twister taking bearing in a casing upon the ends of its radial twisting and driving teeth, in combination with a superposed rotary cutter, a rotary holder, and a central bolt passing axially through the twister, cutter, and holder to clamp them together.

22. The combination, with the rotary part of the wire-cutting mechanism and with the converse part carried by the twister, of the central holding-bolt, substantially as described.

23. The combination, with the rotary parts of the wire-holding and wire-cutting mechanism and with the converse part carried by the twister, of the central holding and adjusting bolt, substantially as described.

24. The central bolt, *n*, to hold and adjust the rotary parts of the wire-holding and wire-cutting mechanism against the face of the converse part carried by the twister, substantially as described.

SYLVANUS D. LOCKE.

Witnesses:
MELVIN TULLER,
A. H. ELWOOD.